US008782443B2

(12) United States Patent
Belady et al.

(10) Patent No.: US 8,782,443 B2
(45) Date of Patent: Jul. 15, 2014

(54) RESOURCE-BASED ADAPTIVE SERVER LOADING

(75) Inventors: Christian L. Belady, Mercer Island, WA (US); Shaun L. Harris, Sammamish, WA (US); Ame M. Josefsberg, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 12/786,800

(22) Filed: May 25, 2010

(65) Prior Publication Data

US 2011/0296225 A1    Dec. 1, 2011

(51) Int. Cl.
G06F 1/00    (2006.01)
G06F 1/26    (2006.01)

(52) U.S. Cl.
USPC .............................. 713/300; 713/320; 713/323

(58) Field of Classification Search
None
See application file for complete search history.

(56) References Cited

U.S. PATENT DOCUMENTS

| | | |
|---|---|---|
| 2,798,898 A | 7/1957 | Popovich |
| 3,187,086 A | 6/1965 | Moodie |
| 3,346,687 A | 10/1967 | Giger et al. |
| 4,849,581 A | 7/1989 | Larkin et al. |
| 5,214,314 A | 5/1993 | Dillard et al. |
| 5,466,889 A | 11/1995 | Faulkner et al. |
| 5,486,651 A | 1/1996 | Morgan |
| 5,694,312 A | 12/1997 | Brand et al. |
| 5,760,339 A | 6/1998 | Faulkner et al. |
| 5,918,641 A | 7/1999 | Hardy et al. |
| 5,969,938 A | 10/1999 | Byrne et al. |
| 6,040,976 A | 3/2000 | Bruner et al. |
| 6,184,594 B1 | 2/2001 | Kushnarenko |
| 6,381,122 B2 | 4/2002 | Wagener |
| 6,392,141 B1 | 5/2002 | Smith |
| 6,754,066 B2 | 6/2004 | Doan et al. |
| 6,786,749 B2 | 9/2004 | Meiners et al. |
| 6,836,098 B1 | 12/2004 | O'Brien |
| 6,856,047 B2 | 2/2005 | Murabayashi et al. |
| 6,934,147 B2 | 8/2005 | Miller et al. |
| 7,173,811 B2 | 2/2007 | Abrahamsen et al. |
| 7,173,821 B2 | 2/2007 | Coglitore |
| 7,210,048 B2 | 4/2007 | Bodas |
| 7,254,742 B2 | 8/2007 | Hayashi |
| 7,271,506 B1 | 9/2007 | Bersiek |
| 7,296,172 B2 | 11/2007 | Hsu et al. |

(Continued)

OTHER PUBLICATIONS

"PowerVision® UPS Power Management Software for Enterprises", Retrieved at << http://www.computerenvironmental.com/software/Powervision.pdf >>, Jun. 2003, pp. 6.

(Continued)

*Primary Examiner* — Kim Huynh
*Assistant Examiner* — Vincent Chang
(74) *Attorney, Agent, or Firm* — Jim Sfekas; Kate Drakos; Micky Minhas (57) ABSTRACT

Resource-based adaptive server loading is described. In embodiments, a current load level can be determined for a resource that is utilized by an adaptive server system to process computer-executable instructions that are a dynamic computational demand on the adaptive server system. The current load level is compared with a target load level for the resource to establish a resource load level comparison. The adaptive server system can then be reconfigured, based on the resource load level comparison, to change the current load level on the resource for resource overload protection.

20 Claims, 5 Drawing Sheets

(56) References Cited

U.S. PATENT DOCUMENTS

| | | | |
|---|---|---|---|
| 7,339,786 | B2 | 3/2008 | Bottom et al. |
| 7,379,305 | B2 | 5/2008 | Briggs et al. |
| 7,395,444 | B2 | 7/2008 | Ives |
| 7,425,682 | B2 | 9/2008 | Rasmussen et al. |
| 7,440,260 | B2 | 10/2008 | Parker et al. |
| 7,450,368 | B2 | 11/2008 | Parker et al. |
| 7,495,415 | B2 | 2/2009 | Kanouda et al. |
| 7,509,506 | B2 | 3/2009 | Bahali et al. |
| 7,514,815 | B2 | 4/2009 | Paik et al. |
| 7,519,909 | B2 | 4/2009 | Kuiawa et al. |
| 7,533,283 | B2 | 5/2009 | Fung |
| 7,542,268 | B2 | 6/2009 | Johnson, Jr. |
| 7,560,831 | B2 | 7/2009 | Whitted et al. |
| 7,561,411 | B2 | 7/2009 | Johnson, Jr. |
| 7,718,889 | B2 | 5/2010 | Rasmussen et al. |
| 7,760,516 | B2 | 7/2010 | Johnson, Jr. et al. |
| 7,782,596 | B2 | 8/2010 | Ross |
| 7,791,894 | B2 | 9/2010 | Bechtolsheim |
| 7,857,214 | B2 | 12/2010 | Saliaris |
| 8,080,900 | B2 | 12/2011 | Corhodzic et al. |
| 8,384,244 | B2 | 2/2013 | Peterson et al. |
| 8,487,473 | B2 | 7/2013 | Peterson et al. |
| 2001/0003207 | A1 | 6/2001 | Kling et al. |
| 2003/0052543 | A1 | 3/2003 | Boost |
| 2003/0109965 | A1 | 6/2003 | Gee |
| 2004/0000815 | A1 | 1/2004 | Pereira |
| 2004/0163001 | A1 | 8/2004 | Bodas |
| 2004/0229621 | A1 | 11/2004 | Misra |
| 2004/0231875 | A1 | 11/2004 | Rasmussen et al. |
| 2005/0052805 | A1 | 3/2005 | Sato et al. |
| 2005/0258922 | A1 | 11/2005 | Rowe et al. |
| 2006/0002056 | A1 | 1/2006 | Abrahamsen et al. |
| 2006/0151190 | A1 | 7/2006 | Rasmussen et al. |
| 2006/0248325 | A1* | 11/2006 | Fung ................................ 713/1 |
| 2006/0267409 | A1 | 11/2006 | Mullet et al. |
| 2007/0037455 | A1 | 2/2007 | Cabrera et al. |
| 2007/0168088 | A1 | 7/2007 | Ewing et al. |
| 2007/0187343 | A1 | 8/2007 | Colucci et al. |
| 2007/0217125 | A1 | 9/2007 | Johnson |
| 2007/0217178 | A1 | 9/2007 | Johnson et al. |
| 2007/0278860 | A1 | 12/2007 | Krieger et al. |
| 2008/0197706 | A1 | 8/2008 | Nielsen |
| 2008/0245083 | A1 | 10/2008 | Tutunoglu et al. |
| 2008/0268331 | A1 | 10/2008 | Douglas |
| 2009/0021078 | A1 | 1/2009 | Corhodzic et al. |
| 2009/0034166 | A1 | 2/2009 | Rasmussen et al. |
| 2009/0034167 | A1 | 2/2009 | Rasmussen et al. |
| 2009/0073641 | A1 | 3/2009 | Ross |
| 2009/0112522 | A1 | 4/2009 | Rasmussen |
| 2009/0195075 | A1 | 8/2009 | Ziegler et al. |
| 2009/0223240 | A1 | 9/2009 | Bean |
| 2009/0309570 | A1 | 12/2009 | Lehmann et al. |
| 2010/0020475 | A1 | 1/2010 | Spitaels et al. |
| 2010/0275441 | A1 | 11/2010 | Rasmussen et al. |
| 2011/0304211 | A1 | 12/2011 | Peterson |
| 2011/0316338 | A1 | 12/2011 | Peterson |
| 2012/0079321 | A1 | 3/2012 | Williams |
| 2012/0098343 | A1 | 4/2012 | Harris |

OTHER PUBLICATIONS

"Ups Monitoring Software: Cut Down the Burden of Manual Ups Handling", Retrieved at << http://www.articlesbase.com/software-articles/ups-monitoring-software-cut-down-the-burden-of-manual-ups-handling-716430.html >>, Jan. 9, 2009, pp. 3.

"Monitoring UPS Power Status Using Network UPS Tools (NUT) 2.2.0 on Multiple OpenSuSE 10.3 Servers", Retrieved at << http://www.howtoforge.com/monitoring-ups-power-status-with-nut-on-opensuse10.3 >>, Apr. 14, 2008, pp. 14.

"The High-end UPS for Top Security", Retrieved at << http://www.online-usv.de/downloads/db_xrt_en_2009-10-28.pdf >>, Retrieved Date: Feb. 24, 2010, pp. 6.

"SmartPro Rack/Tower UPS", Retrieved at << http://www.upsgalaxy.com/pdf/1514.pdf >>, Retrieved Date: Feb. 24, 2010, pp. 5.

"MopUPS", Retrieved at << http://www.chloridepower.com/en/USA/Monitoring-Tools/Software-for-UPS-monitoring-and-computer-shutdown/ >>, Retrieved Date:Feb. 25, 2010, pp. 2.

"Battery Management Solutions: High Performance Analog ICs", Linear Technology Corporation, Available at <http://www.linear.com/pc/downloadDocument.do?id=10777>,(2010),32 pages.

"End-to-End Embedded Power Solutions 2010 Product Selection Guide", Lineage Power, (2010),32 pages.

"Lineage Power Data Center", Retrieved from: <http://www.lineagepower.com/?page_id=275> on Dec. 9, 2010, (2010),2 pages.

"Lineage Power Energy Systems", Retrieved from: <http://www.lineagepower.com/?page_id=285> on Dec. 9, 2010, (2010),5 pages.

"Non-Final Office Action", U.S. Appl. No. 12/797,497, (May 10, 2012),21 pages.

"Next Generation Data Center Infrastructure", Retrieved from <http://www.sgi.com/pdfs/4172.pdf> on Feb. 21, 2010, sgi White Paper, ICE Cube Modular Data Center,(Feb. 21, 2010),pp. 1-12.

Felter, Wes et al., "A Performance-Conserving Approach for Reducing Peak Power Consumption in Server Systems", In Proceedings of ICS' 05, (Jun. 2005),10 pages.

Hungria, Anderson "Build for Today. Expand on Demand", Eaton Corp., Available at <http://www.youpowerthrough.com/pdf/Modularity-AndersonHungaria.pdf>,(Nov. 2008),pp. 1-15.

Noer, Geoffrey "Power and Cooling in a Containerised Data Center", Retrieved from: <http://www.datacenterdynamics.com/ME2/dirmod.asp?sid=&nm=&type=Publishing
&mod=Publications::Article
&mid=8F3A7027421841978F18BE895F87F791&tier=4
&id=818B9E52878348FBA2CF87C3E00FAD54> on Feb. 23, 2010, (Jun. 25, 2009),2 pages.

Rasmussen, Neil "Power and Cooling Capacity Management for Data Centers", APC by Schneider Electric White Paper #150, Available at <http://www.apcmedia.com/salestools/NRAN-6C25XM_R0_EN.pdf>,(2007),pp. 1-18.

Wang, Xiaorui et al., "SHIP: Scalable Hierarchical Power Control for Large-Scale Data Centers", PACT 2009, Available at <http://ieeexplore.ieee.org/stamp/stamp.jsp?tp=
&arnumber=5260553>,(2009),10 pages.

"International Search Report", Mailed Date: Dec. 26, 2011, Application No. PCT/US2011/037076 , Filed Date: May 19, 2011, pp. 8.

"PCT Search Report and Written Opinion", Application No. PCT/US2011/041022, (Dec. 20, 2011), 9 pages.

"PCT Search Report and Written Opinion", Application No. PCT/US2011/037627, (Feb. 9, 2012), 10 pages.

"HP R3000v UPS Uninterruptible Power System (UPS)", Retrieved from: <http://h18000.www1.hp.com/products/quickspecs/13129_div/13129_div.HTML> on Sep. 13, 2010 (Mar. 12, 2009),5 pages.

"Corrected Notice of Allowance", U.S. Appl. No. 12/797,497, (Jan. 28, 2013), 2 pages.

"Non-Final Office Action", U.S. Appl. No. 12/822,949, (Sep. 6, 2012), 9 pages.

"Notice of Allowance", U.S. Appl. No. 12/797,497, (Dec. 3, 2012), 12 pages.

"Non-Final Office Action", U.S. Appl. No. 12/912,696, (Apr. 26, 2013), 9 pages.

"Notice of Allowance", U.S. Appl. No. 12/822,949, (Mar. 6, 2013), 7 pages.

"Non-Final Office Action", U.S. Appl. No. 12/912,696, (Sep. 23, 2013),11 pages.

"Final Office Action", U.S. Appl. No. 12/912,696, Feb. 3, 2014, 11 pages.

* cited by examiner

RESOURCE-BASED ADAPTIVE SERVER LOADING

BACKGROUND

Resource utilization by server systems is dynamic, as computational demand on the server systems varies. Spikes in computational demand on a server system can lead to resource overloading, resulting in system shutdown, failure, and/or data loss. For example, an uninterruptable power supply may shutdown responsive to overloading causing thousands of servers to lose power. In order to prevent resource overloading, server systems are often run significantly under-capacity in anticipation of worst case computational demand. As a result, server systems are inefficient because the capacity that is reserved to compensate for computational demand spikes is unavailable for normal server activity.

SUMMARY

This summary is provided to introduce simplified concepts of resource-based adaptive server loading that are further described below in the Detailed Description. This summary is not intended to identify essential features of the claimed subject matter, nor is it intended for use in determining the scope of the claimed subject matter.

Resource-based adaptive server loading is described. In embodiments, a current load level can be determined for a resource that is utilized by an adaptive server system to process computer-executable instructions that are a dynamic computational demand on the adaptive server system. The current load level is compared with a target load level for the resource to establish a resource load level comparison. The adaptive server system can then be reconfigured, based on the resource load level comparison, to change the current load level on the resource for resource overload protection.

In other embodiments, a resource may be an uninterruptable power supply, and the adaptive server system can be reconfigured based on an output level of the uninterruptable power supply. The resources may also include an electrical resource and/or a thermal resource. In embodiments, an updated load level on the resource can be determined after a time interval elapses, where the time interval corresponds to a time duration between when the current load level is determined and when the updated load level is determined. The updated load level is compared with the target load level for the resource to establish an updated resource load level comparison, and the need to reconfigure the adaptive server system for resource overload protection is verified based on the updated load level comparison. Reconfiguring the adaptive server system may include throttling and/or shutting down server devices of the adaptive server system. The adaptive server system may include one or more server devices that are ranked hierarchically based on criticality, and the server devices of the adaptive server system can be reconfigured based on a hierarchical rank of the server devices.

BRIEF DESCRIPTION OF THE DRAWINGS

Embodiments of resource-based adaptive server loading are described with reference to the following drawings. The same numbers are used throughout the drawings to reference like features and components.

DETAILED DESCRIPTION

Embodiments of resource-based adaptive server loading are described. An adaptive server system can be reconfigured, based on a resource load level comparison, to change the current load level on the resource for resource overload protection allowing the adaptive server system to continue to operate. For example, one or more server devices can be reconfigured, based on an output level of an uninterruptable power supply, to protect the uninterruptable power supply from overload. An adaptive load manager is implemented to align resource performance with server demands, such as by monitoring uninterruptable power supply limits and then shutting down server devices based on the power supply limits.

The server devices in an adaptive server system can be controlled based on an output of the uninterruptable power supply, and/or based on other resources and predefined limits. It should be noted that an uninterruptable power supply (UPS) may be implemented to operate at 150% load for ten (10) seconds, 125% load for ten (10) minutes, and 104% of its rating without interruption. However, typical UPS implementations for a data center are designed not to exceed 100% peak to avoid operating in the time-constrained regions, even for short durations of time. In embodiments of resource-based adaptive server loading, the averages and/or time durations are also monitored when a UPS operates at more than 100% load to control shut down and/or throttling of resources when the time durations are exceeded.

In addition to a power source, other resources that may be utilized by an adaptive server system can include cooling, thermal, and electrical resources, as well as resources that may change due to seasonal and/or ambient conditions. Other environmental conditions that may be monitored by an adaptive load manager include altitude, temperature, humidity, and other various environmental conditions. For example, a typical UPS may be specified for operation at 40 C ambient, but implemented to operate at approximately 20 C ambient. Accordingly, there may be approximately 15% extra capacity that is not being utilized, but that can be monitored by the adaptive load manager based on the various environmental conditions.

In various embodiments, a current load level can be determined for a resource that is utilized by an adaptive server system to process computer-executable instructions that are a dynamic computational demand on the adaptive server system. The current load level is compared with a target load level for the resource to establish a resource load level comparison. The adaptive server system can then be reconfigured, based on the resource load level comparison, to change the current load level on the resource for resource overload protection. An adaptive server system that can be reconfigured based on resource loading provides that a data center, for example, can be designed to include more server devices that use the upper capacity limits of the resources, rather than having to design for a large buffer of unused resource capacity, which may limit a data center by as much as 10-20% of resource capacity.

While features and concepts of the described systems and methods for resource-based adaptive server loading can be implemented in any number of different environments, systems, and/or various configurations, embodiments of resource-based adaptive server loading are described in the context of the following example systems and environments.

Figure 1:
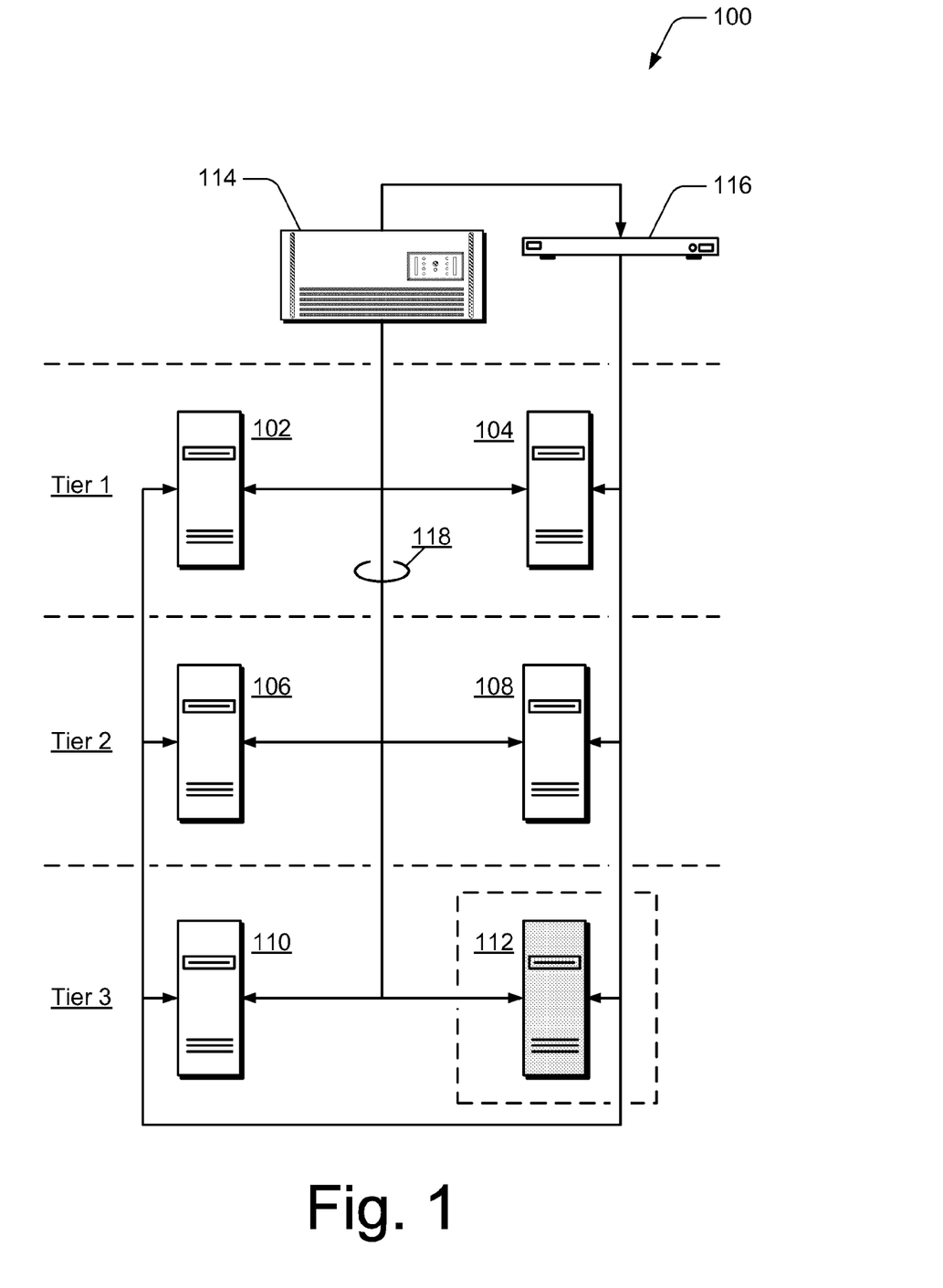
FIG. 1 illustrates an example system in which embodiments of resource-based adaptive server loading can be implemented.

FIG. 1 illustrates an example adaptive server system 100 in which various embodiments of resource-based adaptive server loading can be implemented. The adaptive server system 100 includes server devices 102-112 that each process computer-executable instructions, which are a dynamic demand on the server devices. Embodiments of resource-based adaptive server loading can be implemented at the rack level (e.g., server devices 102-112 represent racks), at the data center level, and/or in a hierarchy system. In this example, the server devices 102-112 are ranked hierarchically based on criticality. Server devices 102 and 104 are ranked as tier level 1 server devices, or lowest criticality. Server devices 106 and 108 are ranked as tier level 2 server devices, higher than tier level 1 in criticality. Server device 110 is ranked as a tier level 3 server device, the highest criticality tier in this example. Finally, as a mission critical server device, server device 112 is not ranked. Although only server devices 102-112 are described and illustrated, the adaptive server system 100 may include any number of server devices and/or tier levels in the various embodiments of resource-based adaptive server loading as described herein.

To meet the dynamic computational demand, the server devices 102-112 utilize uninterruptable power supply 114. The example adaptive server system 100 also includes an adaptive load manager 116 capable of reconfiguring one or more of the server devices 102-112 in the adaptive server system for resource overload protection. In various implementations, reconfiguring the server devices may include any one or combination of shutting down or throttling one or more of the server devices, shutting down groups of server devices (e.g., in a rack configuration), or turning off individual components inside a server device, such as memory dims, processors or processor cores, IO, drives, etc.

In various embodiments, the adaptive load manager 116 can be implemented as an independent component or device, or as an integrated component of a server device or the uninterruptable power supply 114. Alternatively or in addition, the adaptive load manager can be implemented as computer-executable instructions that are executed by one or more processors to implement the various embodiments and/or features described herein. In addition, any of the devices described with reference to the example system 100 can be implemented with any number and combination of differing components as further described with reference to the example device shown in FIG. 5.

In an embodiment, a current load level on one or more resources of an adaptive server system can be determined. Resources may include power, cooling, electrical, and/or thermal resources, as well as time constants associated with any of the resources. A load level on a resource may be determined at an input, output, and/or any other suitable point of resource distribution or utilization. The adaptive server system may include server devices configured in a rack and/or server devices configured as racks, such as in a data center. In this example, the adaptive load manager 116 can be implemented to determine a current load level on the uninterruptible power supply 114 based on an output 118 of the uninterruptible power supply.

The current load level can be compared with a target load level for the resource to establish a load level comparison. In this example, adaptive load manager 116 can be implemented to compare the current load level on the uninterruptable power supply 114 with a target load level for the uninterruptable power supply, establishing a load level comparison.

One or more of the server devices 102-112 can be reconfigured based on the resource load level comparison to change the current load level on the one or more resources for resource overload protection. In some implementations, any of the server devices can be reconfigured by throttling server processing, redistributing the dynamic computational demand, or shutting down. Alternatively or in addition, individual components inside a server device may be turned off, such as memory dims, processors or processor cores, IO, drives, etc. In this example, the adaptive load manager 116 can be implemented to throttle one or more of the server devices 102-112 based on the load level comparison relating to an output of the uninterruptable power supply 114. In other implementations, any of the server devices can be reconfigured based at least in part on a hierarchical rank of the server devices. For example, the adaptive load manager 116 may shut down the server devices 102 and 104 of tier level 1 as well as the tier level 2 server devices 106 and 108, while allowing server devices 110 and 112 to continue operating normally.

In another embodiment, the current load level of a resource can be compared with multiple target load levels for the resource. A target load level for a resource can be based at least in part on a magnitude of resource loading. Further, each of the target load levels may have an associated time interval not to be exceeded at the respective magnitude of resource loading. For example, multiple target levels may be associated with the uninterruptable power supply 114, and each target level may be based on a respective magnitude of loading of the output 118 of the uninterruptable power supply.

In another embodiment, an updated load level of a resource can be determined after a time interval elapses, such as a time interval that corresponds to a time duration between when the current load level is determined and when the updated load level is determined. In some implementations, the time duration can be based on a magnitude of resource loading. For example, the adaptive load manager 116 can monitor not only the optimal load on a UPS, but also the averages and/or time durations when a UPS operates at more than 100% load, such as for a UPS that is implemented to operate at 150% load for ten (10) seconds, 125% load for ten (10) minutes, and 104% of its rating without interruption. In this embodiment, the updated load level can be compared with the target load level for the resource to establish an updated resource load level comparison. For example, the adaptive load manager 116 can determine an updated load level on uninterruptable power supply 114 after a pre-determined time interval elapses.

Example methods 200, 300, and 400 are described with reference to respective FIGS. 2, 3, and 4 in accordance with one or more embodiments of resource-based adaptive server loading. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 2:
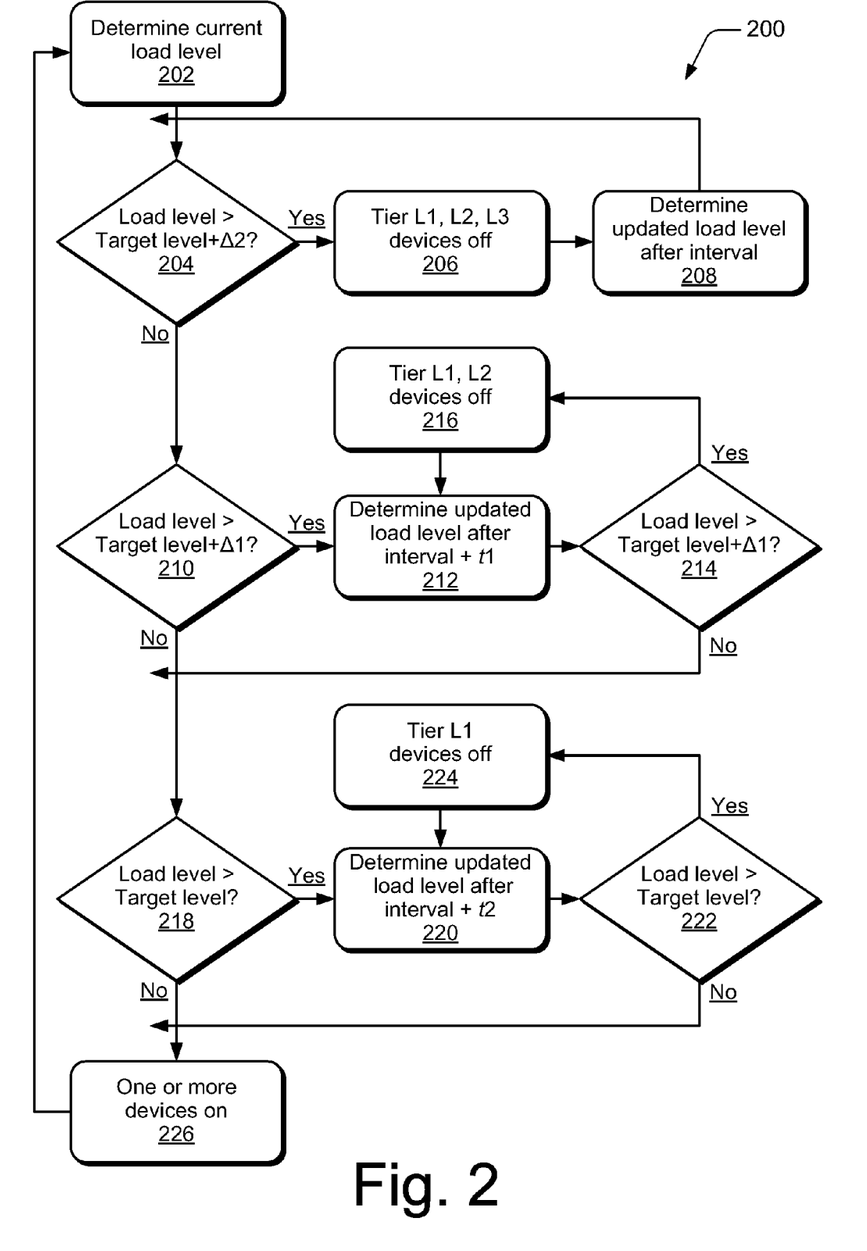
FIG. 2 illustrates example method(s) of resource-based adaptive server loading in accordance with one or more embodiments.

FIG. 2 illustrates example method(s) 200 of resource-based adaptive server loading. The order in which the method blocks are described are not intended to be construed as a limitation, and any number of the described method blocks can be combined in any order to implement a method, or an alternate method.

At block 202, a current load level is determined for a resource utilized by an adaptive server system to process computer-executable instructions that are a dynamic computational demand on the adaptive server system. For example, the adaptive load manager 116 (FIG. 1) determines a current load level for uninterruptable power supply 114 as 120% of rated output.

At block 204, a need to reconfigure the adaptive server system is determined by comparing the current load level with a first target load level for the resource. In an embodiment, the first target level is based at least in part on a magnitude of resource loading. In this example, the first target level is defined as a target level for the resource (e.g. 100% of rated output) plus an additional magnitude of resource loading (e.g. 15% of rated output). For example, adaptive load manager 116 determines reconfiguration of the adaptive server system 100 is needed when the current load level of 120% exceeds the first target load level, in this instance 115%.

At block 206, the adaptive server system is reconfigured as determined by block 204. In an embodiment, non-mission critical tier levels of server devices are shutoff. For example, the adaptive load manager 116 shuts down tier level 1, tier level 2, and tier level 3 server devices of the adaptive server system 100.

At block 208, an updated load level on the resource is determined after a first time interval elapses. The first time interval can correspond to a time duration between when the current load level is determined and when the updated load level is determined. For example, the adaptive load manager 116 determines an updated load level for the uninterruptable power supply 114 as 112% of rated output after one minute elapses.

At block 210, a need to reconfigure the adaptive server system is determined by comparing a load level with a second target load level for the resource. The load level may be a current load level (from block 202) or an updated load level (from block 208). In an embodiment, the second target level is based at least in part on a magnitude of resource loading. In this example, the second target level is defined as a target level for the resource (e.g 100% of rated output) plus an additional magnitude of resource loading (e.g. 10% of rated output). For example, the adaptive load manager 116 determines that reconfiguration of the adaptive server system 100 is needed when the current load level of 112% exceeds the second target load level, in this instance 110%.

At block 212, an updated load level on the resource is determined after a second time interval elapses. The second time interval can correspond to a time duration between when the current load level is determined and when the updated load level is determined. In an embodiment, the second time interval may be greater in duration than the first time interval. For example, the adaptive load manager 116 determines an updated load level for uninterruptable power supply 114 as 111% of rated output after five minutes elapse. In another embodiment, a time interval may be based on a magnitude of resource loading, the time interval not to be exceeded at the respective magnitude of resource loading.

At block 214, a need to reconfigure the adaptive server system is determined by comparing the updated load level and the second target load level for the resource. For example, the adaptive load manager 116 determines reconfiguration of the adaptive server system 100 is needed when the updated load level of 111% exceeds the second target load level, in this instance 110%. In another embodiment, the updated load level can be compared with a different target load level, such as one based on a reconfiguration of one or more server devices.

At block 216, tier level 1 and tier level 2 server devices are reconfigured. In an embodiment, server devices are reconfigured based at least in part on a hierarchical rank. For example, the adaptive load manager 116 shuts down tier level 1 and tier level 2 server devices of adaptive server system 100, but allows the tier level 3 server devices to continue operation.

At block 218, a need to reconfigure the adaptive server system is determined by comparing a load level and a third target load level for the resource. The load level may be a current load level (from block 202) or an updated load level (from block 208 or 214). In an embodiment, the third target level is based at least in part on a magnitude of resource loading. In this example, the third target level is defined as a target level for the resource (e.g. 100% of rated output). For example, the adaptive load manager 116 determines that reconfiguration of the adaptive server system 100 is needed when the current load level of 103% exceeds the third target load level, in this instance 100%.

At block 220, an updated load level on the resource is determined after a third time interval elapses, the third time interval corresponding to a time duration between when the current load level is determined and when the updated load level is determined. In an embodiment, the third time interval may be greater in duration than the second time interval. For example, the adaptive load manager 116 determines an updated load level for uninterruptable power supply 114 as 101% of rated output after ten minutes elapse. In another embodiment, a time interval may be based on a magnitude of resource loading, the time interval not to be exceeded at the respective magnitude of resource loading.

At block 222, a need to reconfigure the adaptive server system is determined by comparing the updated load level and the third target load level for the resource. For example, the adaptive load manager 116 determines that reconfiguration of the adaptive server system 100 is needed when the current load level of 101% exceeds the third target load level, in this instance 100%.

At block 224, tier level 1 server devices are reconfigured. In an embodiment, server devices are reconfigured based at least in part on a hierarchical rank. For example, the adaptive load manager 116 shuts down tier level 1 server devices of adaptive server system 100.

At block 226, one or more server devices are reconfigured for normal operation. For example, all of the server devices may be reconfigured for normal operation over a time duration, such as one or more devices, or a subset group of the server devices, turned back on gradually rather than all of them turned-on at once. Any number or combination of the described method blocks 202-226 may be combined and/or repeated to implement various embodiments of resource-based adaptive server loading. Additionally, the described load level percentages and the time intervals are merely examples for discussion, and any other load level percentages and/or time intervals may be pre-defined or utilized in the various embodiments described herein.

Figure 3:
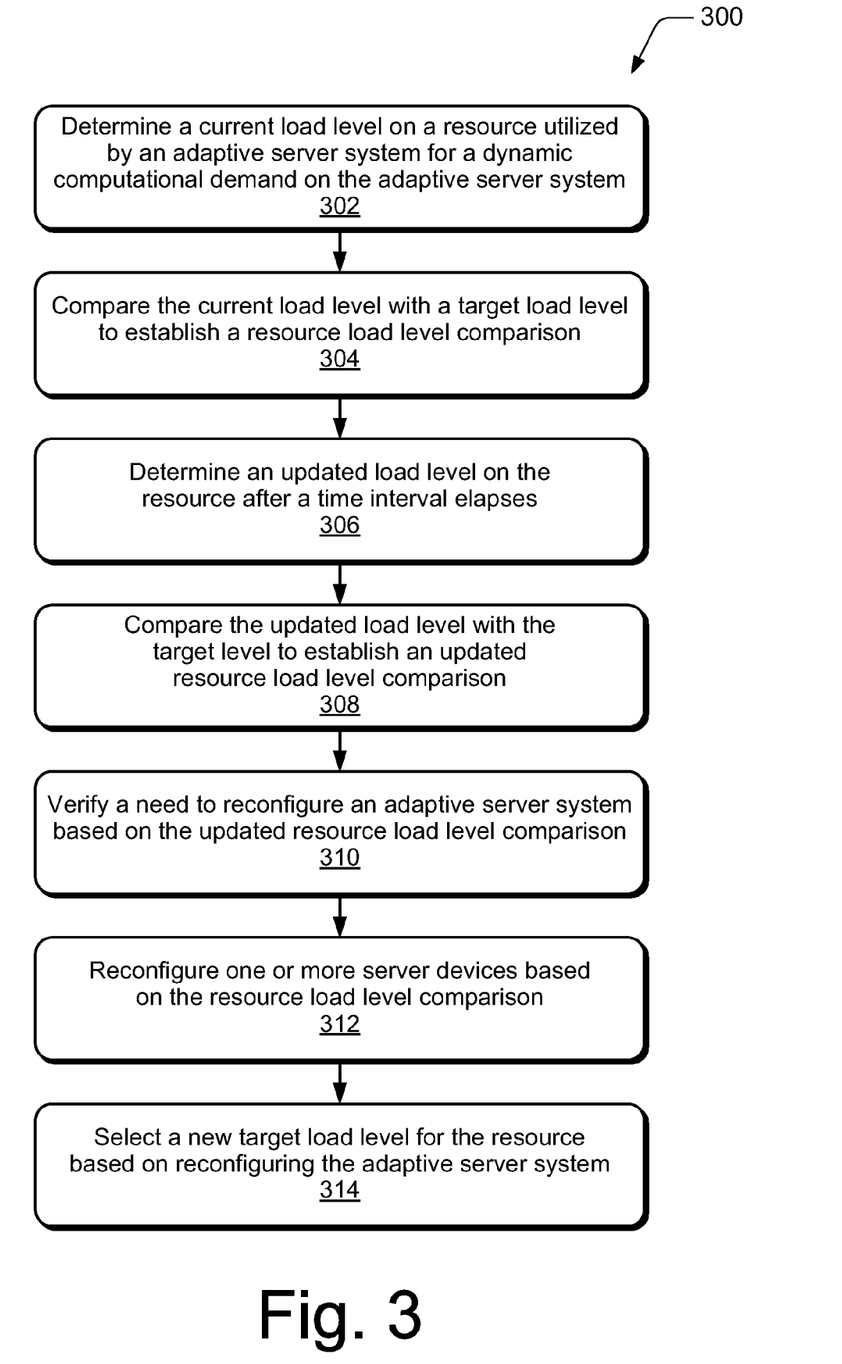
FIG. 3 illustrates additional example method(s) of resource-based adaptive server loading in accordance with one or more embodiments.

FIG. 3 illustrates example method(s) 300 of resource-based adaptive server loading, and is described with reference to an adaptive load manager. The order in which the method blocks are described are not intended to be construed as a limitation, and any number of the described method blocks can be combined in any order to implement a method, or an alternate method.

At block 302, a current load level is determined for a resource utilized by an adaptive server system to process computer-executable instructions that are a dynamic computational demand on the adaptive server system. For example, the adaptive load manager 116 (FIG. 1) determines a current load level for the uninterruptable power supply 114 that is utilized by server devices 102-112 of the adaptive server system 100. In an embodiment, a current load level for a resource, such as the uninterruptable power supply, is based on an output level of the uninterruptable power supply.

At block 304, the current load level is compared with a target load level for the resource to establish a resource load level comparison. For example, the adaptive load manager 116 compares the current load level on the uninterruptable power supply 114 with a target load level to establish a resource load level comparison. In another embodiment, the current load level is compared with multiple target load levels for the a resource, and each of the target load levels are based at least in part on a respective magnitude of resource loading. Each of the target load levels may also have an associated time interval not to be exceeded at the respective magnitude of resource loading.

Optionally at block 306, an updated load level on the resource is determined after a time interval elapses. The time interval can correspond to a time duration between when the current load level is determined and when the updated load level is determined. In another embodiment, one or more target load levels have an associated time interval not to be exceeded at the respective magnitude of resource loading. For example, the adaptive load manager 116 determines an updated load level on the uninterruptable power supply 114 after a time interval elapses, and the interval is based on a magnitude of loading of the uninterruptable power supply.

Optionally, at block 308, the updated load level is compared with the target load level for the resource to establish an updated resource load level comparison. For example, the adaptive load manager 116 compares the updated load level with the target load level for the uninterruptable power supply 114, and establishes an updated load level comparison.

Optionally, at block 310, a need to reconfigure the adaptive server system for resource overload protection is verified based on the updated load level comparison. For example, the adaptive load manager 116 verifies a need to reconfigure the adaptive server system 100 based on the updated load level comparison for the uninterruptable power supply 114.

At block 312, the adaptive server system is reconfigured based on the resource load level comparison. The current load level on a resource is changed for resource overload protection. In an embodiment, reconfiguring the adaptive server system is based on an output level of the uninterruptable power supply. For example, the adaptive load manager 116 reconfigures the adaptive server system 100 (e.g., one or more of the server devices 102-112) based on the output of the uninterruptable power supply 114. In another embodiment, reconfiguring the adaptive server system includes at least one of throttling or shutting down one or more of the server devices. Alternatively or in addition, individual components inside a server device may be turned off, such as memory dims, processors or processor cores, IO, drives, etc. For example, the adaptive load manager 116 reconfigures the adaptive server system 100 by throttling one or more of the server devices. In another embodiment, reconfiguring the adaptive server system includes reconfiguring one or more of the server devices based at least in part on a hierarchical rank of the server devices. For example, the adaptive load manager 116 reconfigures the adaptive server system 100 by shutting down the server devices of tier level 1, while allowing the remaining server devices to continue to operate.

Optionally at block 314, a new target load level is selected for the resource based on reconfiguring the adaptive server system. For example, the adaptive load manager 116 may select a new target load level for the uninterruptable power supply 114 based on shutting down the tier level 1 server devices 102 and 104.

Figure 4:
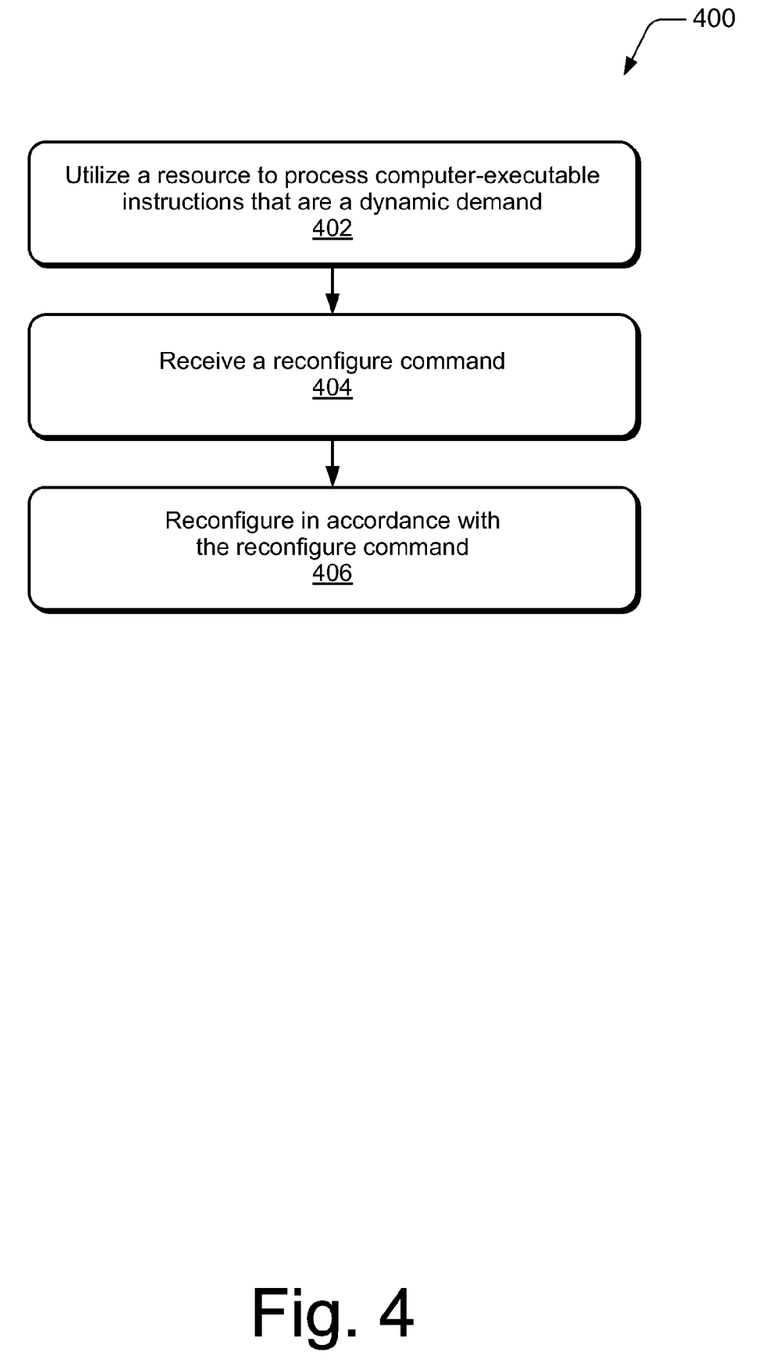
FIG. 4 illustrates additional example method(s) of resource-based adaptive server loading in accordance with one or more embodiments.

FIG. 4 illustrates example method(s) 400 of resource-based adaptive server loading, and is described with reference to a server device that is implemented in an adaptive server system. The order in which the method blocks are described are not intended to be construed as a limitation, and any number of the described method blocks can be combined in any order to implement a method, or an alternate method.

At block 402, a resource is utilized to process computer-executable instructions that are a dynamic computational demand. For example, the server device 102 (FIG. 1) is part of the adaptive server system 100, and the server device 102 utilizes the uninterruptable power supply 114 (e.g., a resource) to process computer-executable instructions that are a dynamic computational demand.

At block 404, a reconfigure command is received from an adaptive server system component that monitors resource utilization. For example, the server device 102 receives a reconfigure command as a command to throttle or shut down based on a determination by the adaptive load manager 116 that the uninterruptable power supply 114 is overloaded.

At block 406, processing is throttled or shutdown in accordance with the reconfigure command. For example, the server device 102 shuts down in accordance with the reconfigure command that is received from the adaptive load manager 116.

Figure 5:
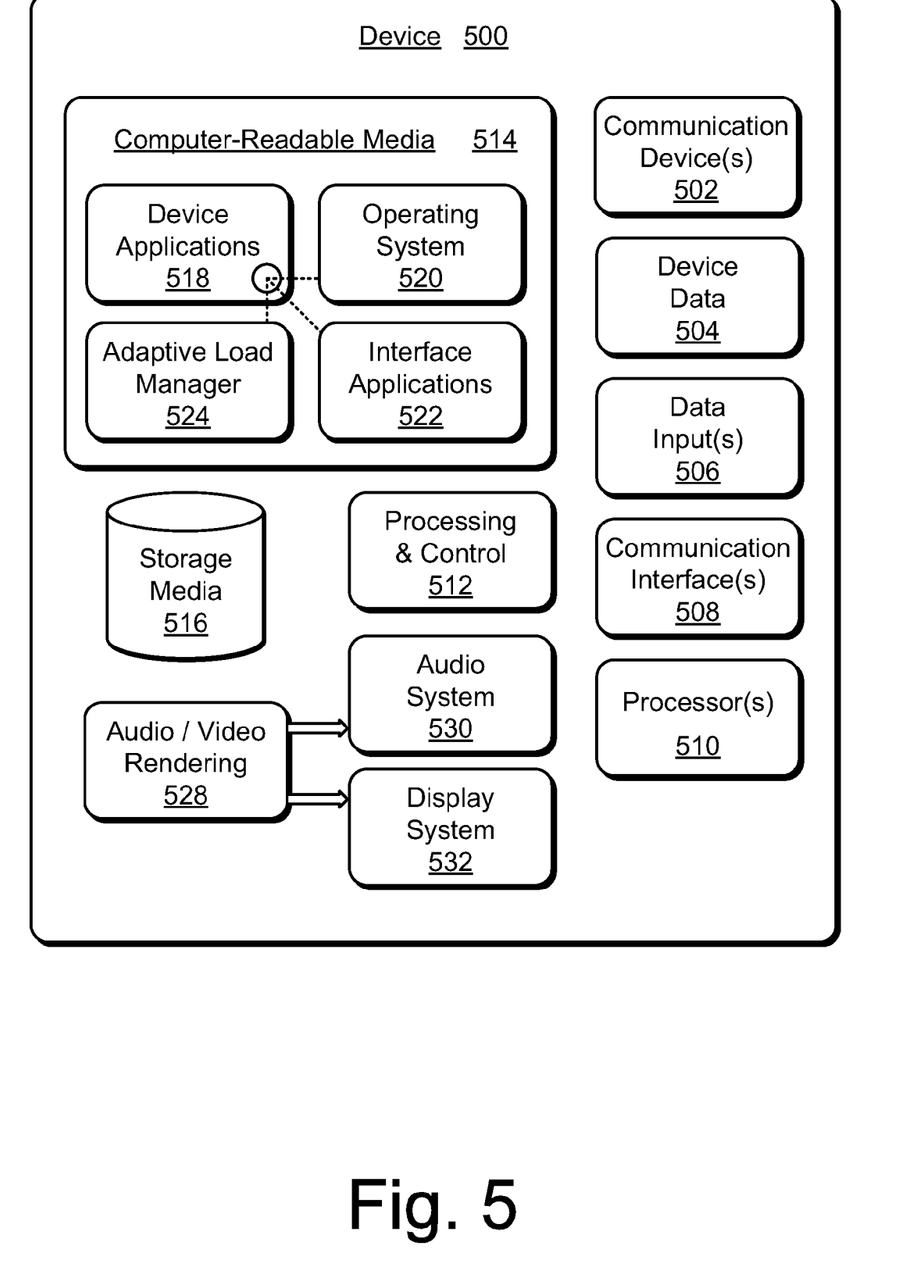
FIG. 5 illustrates various components of an example device that can implement embodiments of resource-based adaptive server loading.

FIG. 5 illustrates various components of an example device 500 that can be implemented as any type of server, electronic, and/or computing device as described with reference to the previous FIGS. 1-4 to implement embodiments of resource-based adaptive server loading. In embodiments, device 500 can be implemented as any one or combination of a wired and/or wireless device, consumer device, computer device, server device, portable computer device, user device, communication device, video processing and/or rendering device, appliance device, electronic device, and/or as any other type of device. Device 500 may also be associated with a user (i.e., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of resource-based adaptive server loading. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable storage media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable storage media 514 provides data storage mechanisms to store the device data 504, as well as various device applications 518 and any other types of information and/or data related to operational aspects of device 500. For example, an operating system 520 can be maintained as a computer application with the computer-readable storage media 514 and executed on processors 510. The device applications 518 can include a device manager which may be implemented as any one or combination of a control application, software application, signal processing and control module, code that is native to a particular device, a hardware abstraction layer for a particular device, etc.

The device applications 518 also include any system components or modules to implement embodiments of resource-based adaptive server loading. In this example, the device applications 518 can include interface applications 522 and an adaptive load manager 524. The interface applications 522 and the adaptive load manager 524 are shown as software modules and/or computer applications. Alternatively or in addition, the interface applications 522 and/or the adaptive load manager 524 can be implemented as hardware, software, firmware, or any combination thereof.

Device 500 also includes an audio and/or video rendering system 528 that generates and provides audio data to an audio system 530 and/or generates and provides display data to a display system 532. The audio system 530 and/or the display system 532 can include any devices that process, display, and/or otherwise render audio, display, and image data. Display data and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 530 and/or the display system 532 are implemented as external components to device 500. Alternatively, the audio system 530 and/or the display system 532 are implemented as integrated components of example device 500.

Although embodiments of resource-based adaptive server loading have been described in language specific to features and/or methods, it is to be understood that the subject of the appended claims is not necessarily limited to the specific features or methods described. Rather, the specific features and methods are disclosed as example implementations of resource-based adaptive server loading.

The invention claimed is:

1. An adaptive server system, comprising:
    one or more server devices configured to process computer-executable instructions that are a dynamic computational demand on the one or more server devices;
    one or more uninterruptable power supplies utilized by the one or more server devices to meet the dynamic computational demand to process the computer-executable instructions;
    an adaptive load manager configured to:
        determine a current output level of the one or more uninterruptable power supplies;
        compare the current output level of the uninterruptable power supplies with a target output level for the one or more uninterruptable power supplies to establish an uninterruptable power supply output level comparison;
        determine a time duration, based on the uninterruptable power supply output level comparison, to wait from when the current output level is determined until an updated output level of the one or more uninterruptable power supplies is determined;
        determine the updated output level of the one or more uninterruptable power supplies after the time duration elapses;
        compare the updated output level of the uninterruptable power supplies with the target output level to establish an updated uninterruptable power supply output level comparison; and
        reconfigure the one or more server devices, based on the updated uninterruptable power supply output level comparison, to change the current output level of the one or more uninterruptable power supplies for uninterruptable power supply overload protection.

2. An adaptive server system as recited in claim 1, wherein the adaptive load manager is configured to said
    compare the updated output level with the target output level for the one or more uninterruptable power supplies effective to verify a need to said reconfigure the one or more server devices for uninterruptable power supply overload protection based on the updated uninterruptable power supply output level comparison.

3. An adaptive server system as recited in claim 1, wherein the adaptive load manager is further configured to:
    compare the current output level with multiple target output levels for the one or more uninterruptable power supplies, each of the target output levels based at least in part on a respective magnitude of uninterruptable power supply output and having an associated time interval not to be exceeded at the respective magnitude of uninterruptable power supply output; and determine the time duration to wait based on which of the multiple target output levels is exceeded by the current output level of the one or more uninterruptable power supplies.

4. An adaptive server system as recited in claim 1, wherein the adaptive load manager is further configured to reconfigure the one or more server devices by throttling server processing or shutting down one or more of the server devices.

5. An adaptive server system as recited in claim 1, wherein the one or more server devices are ranked hierarchically based on criticality, and wherein the adaptive load manager is further configured to reconfigure the one or more server devices based at least in part on a hierarchical rank of the one or more server devices.

6. An adaptive server system as recited in claim 1, wherein the adaptive load manager is further configured to reconfigure the one or more server devices by redistributing the dynamic computational demand.

7. An adaptive server system as recited in claim 1, wherein one or more of the server devices are not ranked and are not reconfigured to change the current output level of the one or more uninterruptable power supplies.

8. A computer-implemented method, comprising:
determining a current output level of an uninterruptable power supply utilized by an adaptive server system to process computer-executable instructions that are a dynamic computational demand on the adaptive server system, the adaptive server system comprising one or more server devices that are ranked hierarchically based on criticality;
comparing the current output level of the uninterruptable power supply with a target output level for the uninterruptable power supply to establish an uninterruptable power supply output level comparison;
determining a time duration, based on the uninterruptable power supply output level comparison, to wait from when the current output level is determined until an updated output level of the uninterruptable power supply is determined;
determining the updated output level of the uninterruptable power supply after the time duration elapses;
comparing the updated output level of the uninterruptable power supply with the target output level to establish an updated uninterruptable power supply output level comparison; and
reconfiguring the adaptive server system, based on the updated uninterruptable power supply output level comparison and a hierarchical rank of the one or more server devices, to change the current output level of the uninterruptable power supply for uninterruptable power supply overload protection.

9. A computer-implemented method as recited in claim 8, wherein said comparing the updated output level with the target output level for the uninterruptable power supply to establish an updated uninterruptable power supply output level comparison is effective to verify a need to reconfigure the adaptive server system for uninterruptable power supply overload protection based on the updated output level comparison.

10. A computer-implemented method as recited in claim 8, further comprising selecting a new target output level for the uninterruptable power supply based on said reconfiguring the adaptive server system.

11. A computer-implemented method as recited in claim 8, wherein said reconfiguring the adaptive server system comprises throttling one or more of the server devices.

12. A computer-implemented method as recited in claim 8, wherein the adaptive server system includes at least one or more server devices that are not ranked and are not reconfigured to change the current output level of the uninterruptable power supply.

13. A computer-implemented method as recited in claim 8, wherein the one or more server devices are ranked hierarchically based on criticality, and the method further comprises reconfiguring the one or more server devices based at least in part on a hierarchical rank of the one or more server devices.

14. A computer-implemented method as recited in claim 8, further comprising reconfiguring the adaptive server system by shutting down one or more of the server devices.

15. A computer-readable storage media device comprising stored instructions that are executable and, responsive to executing the instructions, a computer device:
determines a current output level of an uninterruptable power supply utilized by an adaptive server system configured to process computer-executable instructions that are a dynamic computational demand on the adaptive server system, the adaptive server system including two or more server devices;
compares the current output level of the uninterruptable power supply with a target output level for the uninterruptable power supply to establish an uninterruptable power supply output level comparison;
determines a time duration, based on the uninterruptable power supply output level comparison, to wait from when the current output level is determined until an updated output level of the uninterruptable power supply is determined;
determines the updated output level of the uninterruptable power supply after the time duration elapses;
compares the updated output level of the uninterruptable power supply with the target output level to establish an updated uninterruptable power supply output level comparison; and
reconfigures the adaptive server system, based on the updated uninterruptable power supply output level comparison, by redistributing the dynamic computational demand between the server devices to change the current load level of the uninterruptable power supply for uninterruptable power supply overload protection.

16. A computer-readable storage media device as recited in claim 15,
wherein the computer device said compares the updated output level of the uninterruptable power supply with the target output level for the uninterruptable power supply to establish an updated uninterruptable power supply output level comparison that is effective to verify a need to said reconfigure the adaptive server system for uninterruptable power supply overload protection based on the updated uninterruptable power supply output comparison.

17. A computer-readable storage media device as recited in claim 16, further comprising additional instructions that are executable and, responsive to executing the additional instructions, the computer device:
compares the current output level with multiple target output levels for the uninterruptable power supply, each of the target output levels based at least in part on a respective magnitude of uninterruptable power supply output and having an associated time interval not to be exceeded at the respective magnitude of uninterruptable power supply output; and determines the time duration to wait based on which of the multiple target output levels is exceeded by the current output level of the uninterruptable power supply.

18. A computer-readable storage media device as recited in claim 15, wherein the two or more server devices are ranked hierarchically based on criticality, and further comprising additional instructions that are executable and, responsive to executing the additional instructions, the computer device reconfigures the one or more server devices based at least in part on a hierarchical rank of the two or more server devices.

19. A computer-readable storage media device as recited in claim 15, further comprising additional instructions that are executable and, responsive to executing the additional instructions, the computer device further reconfigures the adaptive server system by shutting down one or more of the server devices.

20. A computer-readable storage media device as recited in claim 15, wherein the adaptive server system includes at least one or more server devices that are not ranked and are not reconfigured to change the current output level of the uninterruptable power supply.

\* \* \* \* \*

UNITED STATES PATENT AND TRADEMARK OFFICE
CERTIFICATE OF CORRECTION

| | | |
|---|---|---|
| PATENT NO. | : 8,782,443 B2 | Page 1 of 1 |
| APPLICATION NO. | : 12/786800 | |
| DATED | : July 15, 2014 | |
| INVENTOR(S) | : Belady et al. | |

It is certified that error appears in the above-identified patent and that said Letters Patent is hereby corrected as shown below:

On the title page item [75], line 3, delete "Ame" insert -- Arne --, therefor.

Signed and Sealed this
Twentieth Day of January, 2015

Michelle K. Lee
*Deputy Director of the United States Patent and Trademark Office*